(12) United States Patent
Dey et al.

(10) Patent No.: US 11,625,698 B2
(45) Date of Patent: *Apr. 11, 2023

(54) INTELLIGENT DISTRIBUTED LEDGER CONSENT OPTIMIZING APPARATUS FOR ASSET TRANSFER

(71) Applicant: Bank of America Corporation, Charlotte, NC (US)

(72) Inventors: Subrojyoti Dey, Delhi (IN); Prashant Khare, Mumbai (IN); Kanika Manocha, New Delhi (IN); Ankit Upadhyaya, Haryana (IN); Prashant Bidkar, Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/335,660

(22) Filed: Jun. 1, 2021

(65) Prior Publication Data

US 2022/0383273 A1 Dec. 1, 2022

(51) Int. Cl.
  *G06Q 20/00* (2012.01)
  *G06Q 20/10* (2012.01)
  *G06Q 20/38* (2012.01)

(52) U.S. Cl.
  CPC ......... *G06Q 20/102* (2013.01); *G06Q 20/389* (2013.01); *G06Q 2220/00* (2013.01)

(58) Field of Classification Search
  CPC ...... G06Q 20/10; G06Q 20/38; G06Q 20/102; G06Q 20/389; G06Q 2220/00; G06Q 40/02; G06Q 40/06; G06N 20/00

USPC .................................................. 705/4, 35–45
  See application file for complete search history.

(56) References Cited

U.S. PATENT DOCUMENTS

| | | |
|---|---|---|
| 10,861,016 B2 | 12/2020 | Ma |
| 10,862,899 B2 | 12/2020 | Qiu et al. |
| 10,880,073 B2 | 12/2020 | Hwang et al. |
| 10,885,207 B2 | 1/2021 | Zhang et al. |
| 10,887,081 B2 | 1/2021 | Oberhofer et al. |
| 10,896,149 B2 | 1/2021 | Sato et al. |
| 10,896,195 B2 | 1/2021 | Sato et al. |
| 10,901,955 B2 | 1/2021 | Sato et al. |

(Continued)

*Primary Examiner* — Rajesh Khattar
*Assistant Examiner* — Mohammed H Mustafa
(74) *Attorney, Agent, or Firm* — Banner & Witcoff, Ltd.

(57) ABSTRACT

Aspects of the disclosure relate to processing asset transfers. A computing platform may receive an asset transfer request and extract information from it. The computing platform may modify a distributed ledger to include a new block corresponding to the asset transfer request. The computing platform may identify a consensus method by identifying, for each of a plurality of consensus methods, a subset of blocks from the distributed ledger that, when used to execute the corresponding consensus method, result in a lowest energy consumption value in comparison to remaining subsets of blocks. The computing platform may execute each consensus method using the corresponding identified subset of blocks, which may result in establishing consensus to process the asset transfer request. Based on establishing the consensus, the computing platform may direct an event processing platform to process the asset transfer request, which may cause the event processing platform to process the request accordingly.

20 Claims, 12 Drawing Sheets

(56) References Cited

U.S. PATENT DOCUMENTS

| | | |
|---|---|---|
| 10,922,309 B2 | 2/2021 | Roets et al. |
| 10,936,580 B2 | 3/2021 | Shi et al. |
| 10,943,003 B2 | 3/2021 | Bingham et al. |
| 10,944,565 B2 | 3/2021 | Bingham et al. |
| 10,951,401 B2 | 3/2021 | Hoersten et al. |
| 10,958,443 B2 | 3/2021 | Zhang |
| 10,972,274 B2 | 4/2021 | Redpath et al. |
| 10,972,279 B2 | 4/2021 | Sethi et al. |
| 11,012,232 B2 | 5/2021 | Kurian et al. |
| 11,017,381 B1 | 5/2021 | Winklevoss et al. |
| 11,017,391 B1 | 5/2021 | Winklevoss et al. |
| 11,018,848 B2 | 5/2021 | Castinado et al. |
| 11,023,309 B2 | 6/2021 | Deng |
| 2019/0034923 A1* | 1/2019 | Greco .................. G06Q 20/389 |
| 2019/0340607 A1* | 11/2019 | Lynn .................. G06Q 20/3829 |
| 2020/0074470 A1* | 3/2020 | Deshpande ............ G06Q 20/06 |

\* cited by examiner

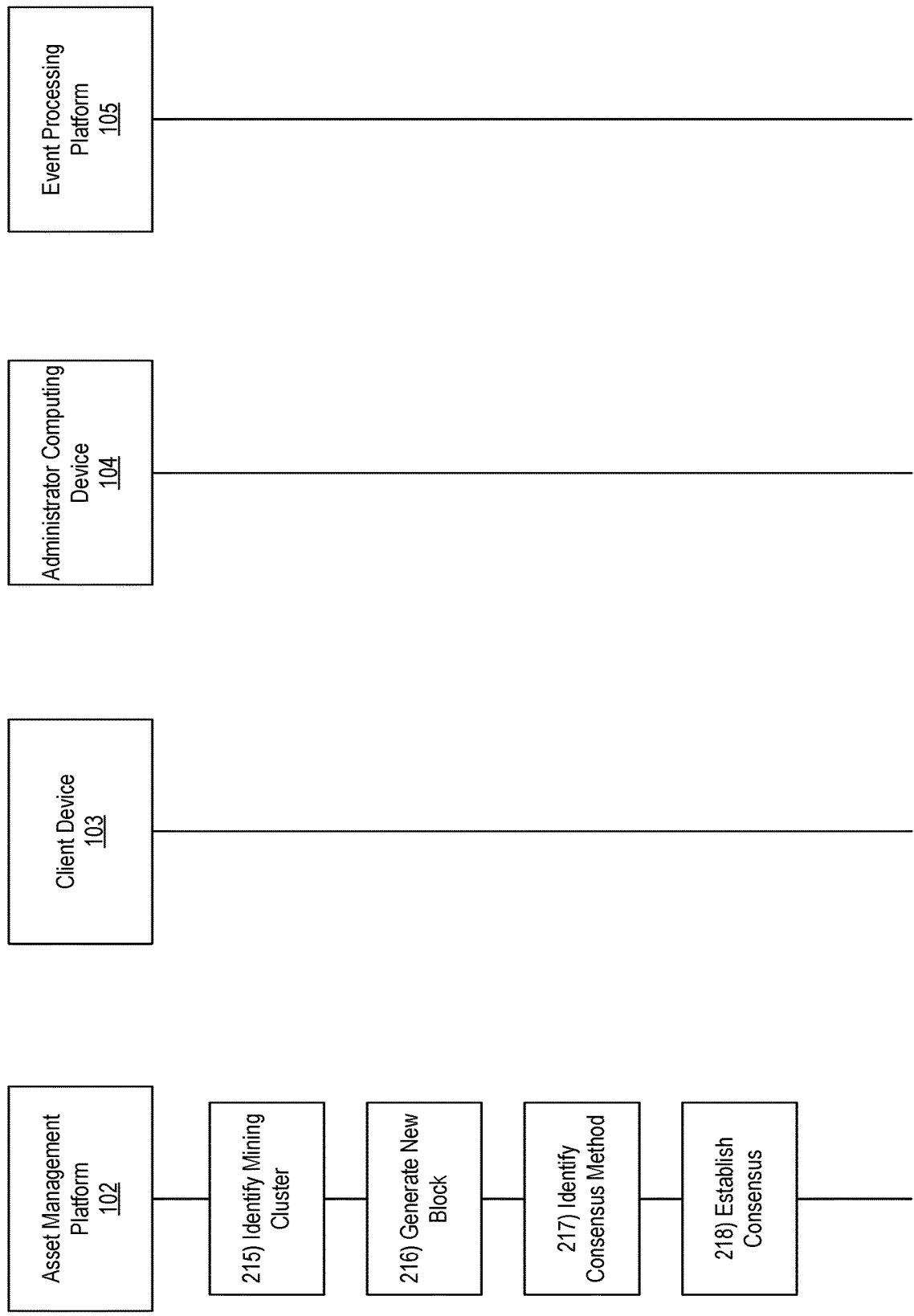

INTELLIGENT DISTRIBUTED LEDGER CONSENT OPTIMIZING APPARATUS FOR ASSET TRANSFER

BACKGROUND

Aspects of the disclosure relate to processing asset transfer requests. In particular, one or more aspects of the disclosure relate to processing asset transfer requests using a distributed ledger.

In some instances, consensus among blocks of a distributed ledger may be used to validate and approve new blocks. In some instances, however, the process of obtaining such consensus may be inefficient and may require significant processing resources to perform. Accordingly, as distributed ledgers are increasingly adopted, it may be important to improve corresponding efficiencies.

SUMMARY

Aspects of the disclosure provide effective, efficient, scalable, and convenient technical solutions that address and overcome the technical problems associated with performing asset transfers. In accordance with one or more embodiments of the disclosure, a computing platform comprising at least one processor, a communication interface, and memory storing computer-readable instructions may receive an asset transfer request. The computing platform may extract, using deep learning based optical character recognition (OCR), information from the asset transfer request. The computing platform may identify a mining cluster for a stored distributed ledger. The computing platform may modify, using the mining cluster, the stored distributed ledger to include a new block corresponding to the asset transfer request. The computing platform may identify a consensus method by identifying, for each of a plurality of consensus methods, a subset of blocks from the stored distributed ledger that, when used to execute the corresponding consensus method, result in a lowest energy consumption value in comparison to remaining subsets of blocks. The computing platform may execute each of the plurality of consensus methods using the corresponding identified subsets of blocks. The computing platform may establish, based on execution of each of the plurality of consensus methods, consensus to process the asset transfer request. Based on establishing the consensus, the computing platform may send one or more commands directing an event processing platform to process an event corresponding to the asset transfer request, which may cause the event processing platform to process the event.

In one or more instances, the information may include one or more of: a financial institution corresponding to the asset transfer request, an amount of the asset transfer, a recipient account, or an originator account. In one or more instances, the computing platform may identify, using the information and a stored list of authenticated financial institutions, whether or not the financial institution corresponding to the asset transfer request is authenticated. Based on identifying that the financial institution corresponding to the asset transfer request is not authenticated, the computing platform may send an authentication request to an administrator computing device. Based on identifying that the financial institution corresponding to the asset transfer request is authenticated, the computing platform may proceed to establish whether or not the asset transfer request is genuine.

In one or more examples, establishing whether or not the asset transfer request is genuine may include identifying whether or not the originator account includes sufficient assets to perform the asset transfer. In one or more examples, based on identifying that the asset transfer request is not genuine, the computing platform may block the asset transfer. Based on identifying that the asset transfer request is genuine, the computing platform may perform the generation of the new block.

In one or more instances, the plurality of consensus methods may include one or more of: proof of work, proof of stake, proof of elapsed time, raft, proof of importance, proof of authority, proof of activity, proof of capacity, or proof of burn. In one or more instances, each subset of blocks may include a minimum number of blocks needed to establish consensus using the corresponding consensus method.

In one or more examples, the computing platform may store, in a governing block of the stored distributed ledger and after identifying the minimum numbers of blocks needed to establish consensus using each of the consensus methods, block combinations having the minimum number for each of the plurality of consensus methods. In one or more examples, the computing platform may receive a second asset transfer request. Instead of identifying the consensus method, the computing platform may execute, based on the minimum numbers of blocks stored in the governing block, each of the plurality of consensus methods on the minimum numbers of blocks to establish consensus for the second asset transfer request.

In one or more instances, the governing block may be configured to store a first set of minimum numbers of blocks for a first type of asset transfer requests and a second set of minimum numbers of blocks for a second type of asset transfer requests. In one or more instances, processing the event may include executing a fund transfer.

In one or more examples, the computing platform may receive a second asset transfer request. The computing platform may identify, by executing each of the plurality of consensus methods, that consensus is not established for the second asset transfer request. The computing platform may modify, based on identifying that consensus is not established, the stored distributed ledger to include a passive block representing the second asset transfer request.

In accordance with one or more additional or alternative embodiments of the disclosure, a computing platform comprising at least one processor, a communication interface, and memory storing computer-readable instructions may receive an asset transfer request. The computing platform may identify a mining cluster for a stored distributed ledger. The computing platform may modify, using the mining cluster, the stored distributed ledger to include a new block corresponding to the asset transfer request. The computing platform may identify a plurality of existing blocks comprising the stored distributed ledger. The computing platform may identify, for each of a plurality of consensus methods, a subset of the plurality of existing blocks that, when used to perform the corresponding consensus method: 1) uses a minimum number of the plurality of existing blocks to perform the corresponding consensus method, and 2) results in a lower energy consumption value than other possible subsets of the plurality of existing blocks. The computing platform may store, in a governing block of the stored distributed ledger, block combinations having the minimum number for each of the plurality of consensus methods, and may execute, using each corresponding identified subset of the existing blocks, each of the plurality of consensus methods. Based on establishing the consensus, the computing platform may send one or more commands directing an event processing platform to process an event corresponding to the asset transfer request, which may cause the event processing platform to process the event.

In one or more instances, the computing platform may extract, using deep learning based optical character recognition (OCR), information from the asset transfer request, where the information may be used to create the new block. In one or more instances, the information may include one or more of: a financial institution corresponding to the asset transfer request, an amount of the asset transfer, a recipient account, or an originator account.

In one or more examples, the computing platform may identify, using the information and a stored list of authenticated financial institutions, whether or not the financial institution corresponding to the asset transfer request is authenticated. Based on identifying that the financial institution corresponding to the asset transfer request is not authenticated, the computing platform may send an authentication request to an administrator computing device. Based on identifying that the financial institution corresponding to the asset transfer request is authenticated, the computing platform may proceed to establish whether or not the asset transfer request is genuine.

In one or more instances, establishing whether or not the asset transfer request is genuine may include identifying whether or not the originator account includes sufficient assets to perform the asset transfer. In one or more instances, based on identifying that the asset transfer request is not genuine, the computing platform may block the asset transfer. In one or more instances, based on identifying that the asset transfer request is genuine, the computing platform may generate the new block.

In one or more examples, the computing platform may establish, based on execution of each of the plurality of consensus methods, the consensus to process the asset transfer request. In one or more examples, the plurality of consensus methods may include one or more of: proof of work, proof of stake, proof of elapsed time, raft, proof of importance, proof of authority, proof of activity, proof of capacity, or proof of burn.

In one or more instances, the computing platform may receive a second asset transfer request. Instead of identifying the consensus method, the computing platform may execute, based on the minimum numbers stored in the governing block, each of the plurality of consensus methods on the minimum numbers of blocks to establish consensus for the second asset transfer request.

In one or more examples, the governing block may be configured to store a first set of minimum numbers of blocks for a first type of asset transfer requests and a second set of minimum numbers of blocks for a second type of asset transfer requests. In one or more examples, processing the event may include executing a fund transfer.

In one or more instances, the computing platform may receive a second asset transfer request. The computing platform may identify, by executing each of the plurality of consensus methods, that consensus is not established for the second asset transfer request. The computing platform may modify, based on identifying that consensus is not established, the stored distributed ledger to include a passive block representing the second asset transfer request.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for an intelligent distributed ledger apparatus for asset transfer in accordance with one or more example embodiments;

DETAILED DESCRIPTION

Figure 1A:
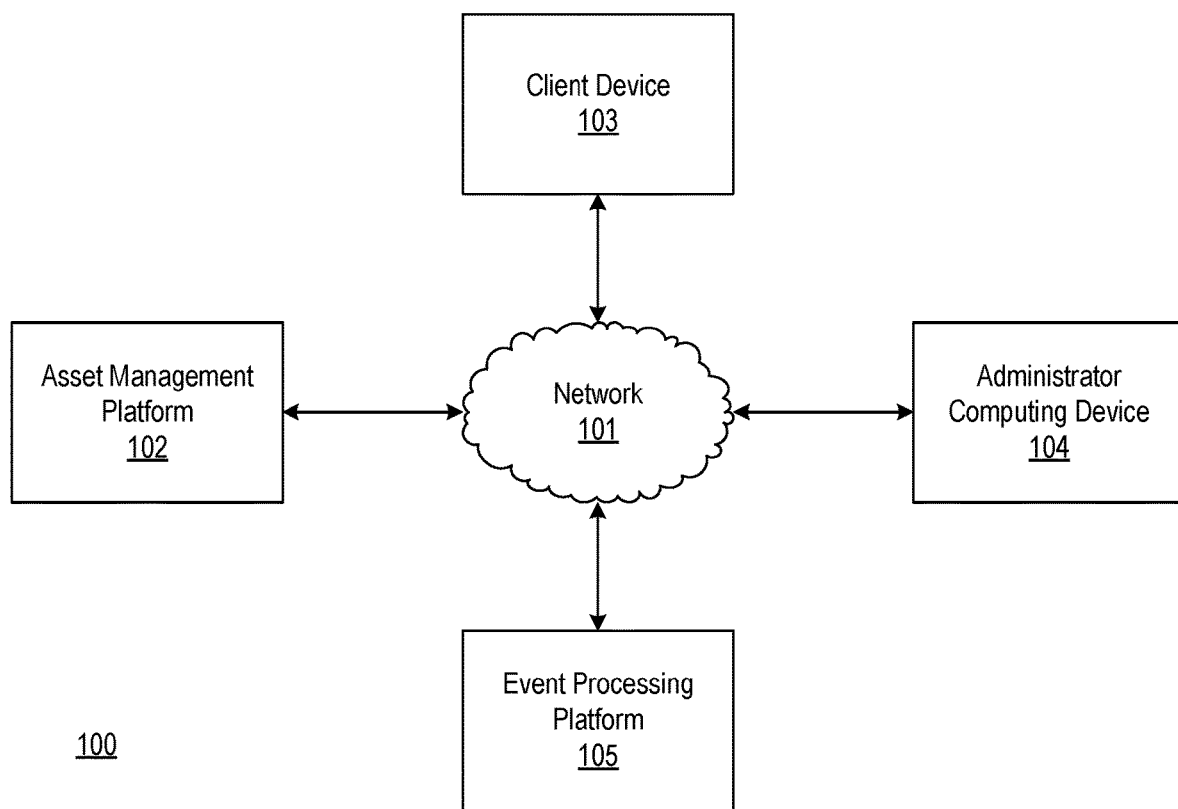
FIGS. 1A-1B depict an illustrative computing environment for an intelligent distributed ledger apparatus for asset transfer in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described below, systems and methods for using a distributed ledger to manage asset transfer services are described herein. More specifically, asset transition services (ATS) operations teams deal in transfers of securities and cash through automated customer account transfers (ACAT), non-ACAT transfers (manual), annuity broker dealer and ownership changes, mutual fund transfers, and transfer paperwork requirements. It may act as a broker/dealer assisting with the transfer of client's incoming and outgoing assets. In the case of an erroneous delivery in or out of machine learning, ATS may perform reclaim activities where accounts are corrected.

Associates may review paperwork to validate transfers, notifying of any discrepancies/missing information through system messages in machine learning transfer systems emails or phone calls. Decisions of validation or rejection of the transfer request may lead to the following problems: 1) authenticity of a customer/asset transfer and securities manipulation, 2) non-association of smaller financial institutions with the network, 3) interbank communication and cumbersome follow up processes, 4) lack of end to end data tracking mechanisms, 5) dealing with multiple data inputs for transfer requests, 6) potential revenue loss due to incorrect delivery, and 7) manual efforts in processing documents/paperwork for asset transfer.

Accordingly, proposed herein is a solution to the above described problems that includes creating a blockchain based solution through which asset transfer may happen seamlessly. For example, a hybrid bagging consensus mechanism may be used to optimize energy in the blockchain using simulation of a combination of different nodes with various consensus methods. Additionally, consensus may be established among different parties to provide the ability to associate non-member banks within the blockchain. This may provide effective and efficient data tracking through the blockchain. In some instances, multiple channels may be leveraged to receive transfer requests to channelize the intake layer. Using computer vision and/or deep learning mechanisms, information may be validated and extracted for authentication.

As a result, the following benefits may be achieved: 1) optimized energy in the entire blockchain network using the best consensus, 2) seamless authentication and communication between financial institutions via block chain nodes, 3) facilitating addition of new smaller financial institutions in the asset transfer platform, 4) elimination of risk with flow of customer information via a distributed digital database secured network, and/or 5) channelizing requests via multiple modes to efficiently reduce the cycle time for asset transfer.

Accordingly, described herein is a system that employs the use of hybrid bagging consensus mechanisms to optimize energy in the blockchain using simulation of combinations of different nodes with various consensus methods, and that generalizes the model basis simulation of similar combinations of nodes and consensus.

Figure 1B:
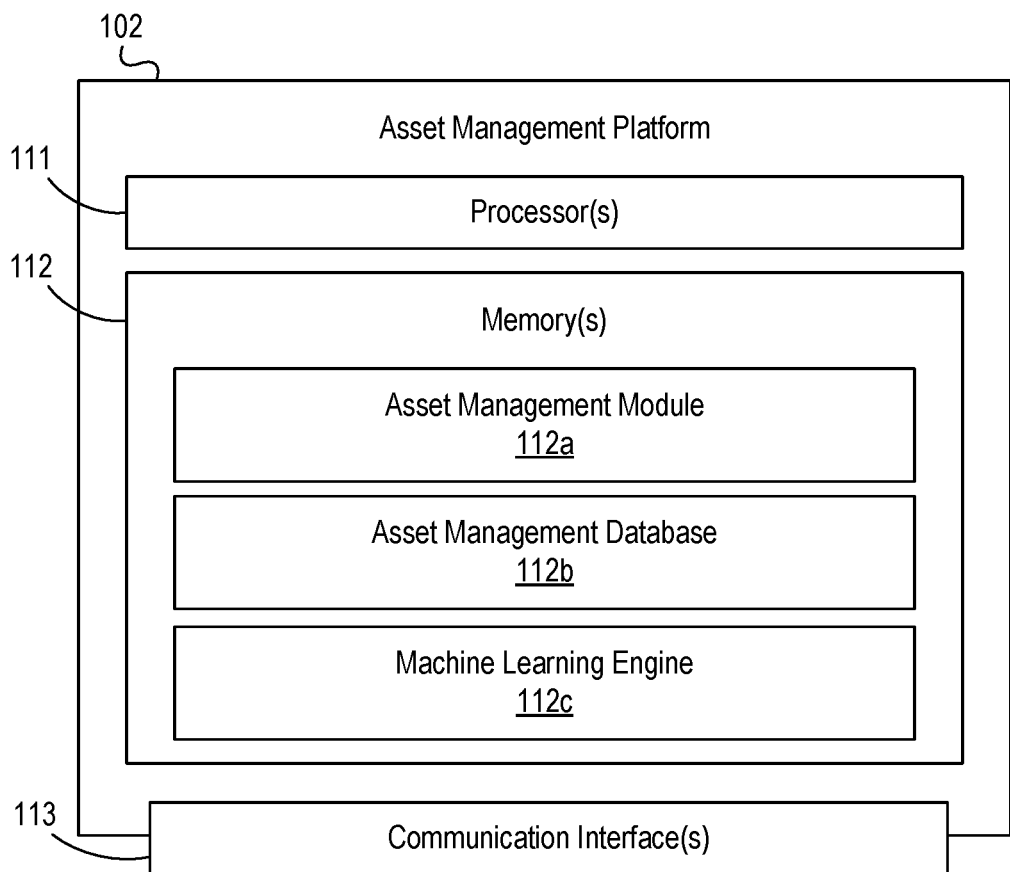

FIGS. 1A-1B depict an illustrative computing environment for an intelligent distributed ledger apparatus for asset transfer in accordance with one or more example embodiments. Referring to FIG. 1A, computing environment 100 may include one or more computer systems. For example, computing environment 100 may include asset management platform 102, client device 103, administrator computing device 104, and event processing platform 105.

As described further below, asset management platform 102 may be a computer system that includes one or more computing devices (e.g., servers, server blades, or the like) and/or other computer components (e.g., processors, memories, communication interfaces) that may a distributed ledger and optimization techniques for asset transfer requests.

Client device 103 may be a laptop computer, desktop computer, mobile device, tablet, smartphone, or the like that may be used by an individual to request an asset transfer (e.g., a transfer of funds, stocks, and/or other assets between accounts hosted by different financial institutions). For example, the client device 103 may be operated by an individual such as a customer of a financial institution, an accountant, a financial advisor, and/or other individual. For example, the client device 103 may be used by one or more individuals to access a mobile application (e.g., a trading application, mobile banking application, or other application), a website (e.g., an online trading portal, online banking portal, and/or other website) and/or perform other functions. In some instances, client device 103 may be configured to display one or more user interfaces (e.g., interfaces that enable asset transfer requests, provide notification of event processing, and/or display other information).

Administrator computing device 104 may be a laptop computer, desktop computer, mobile device, tablet, smartphone, or the like that may be used by an employee of an enterprise organization (e.g., a financial institution, or the like). For example, the administrator computing device 104 may be used by one or more individuals to perform one or more tasks, process events, and/or perform other functions. More specifically, the administrator computing device 104 may be configured to maintain a list of registered/approved financial institutions that may participate in asset transfers. In some instances, administrator computing device 104 may be configured to approve new financial institutions and add them to the list.

Event processing platform 105 may be a computer system that includes one or more computing devices (e.g., servers, server blades, or the like) and/or other computer components (e.g., processors, memories, communication interfaces) that may be configured to process events based on commands or direction from the asset management platform 102. For example, the event processing platform 105 may be configured to process a fund transfer, stock transfer, and/or other asset transfer between accounts.

Computing environment 100 also may include one or more networks, which may interconnect asset management platform 102, client device 103, administrator computing device 104, and event processing platform 105. For example, computing environment 100 may include a network 101 (which may interconnect, e.g., asset management platform 102, client device 103, administrator computing device 104, and/or event processing platform 105).

In one or more arrangements, asset management platform 102, client device 103, administrator computing device 104, and/or event processing platform 105 may be any type of computing device capable of sending and/or receiving requests and processing the requests accordingly. For example, asset management platform 102, client device 103, administrator computing device 104, event processing platform 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of asset management platform 102, client device 103, administrator computing device 104, and/or event processing platform 105, may, in some instances, be special-purpose computing devices configured to perform specific functions.

Referring to FIG. 1B, asset management platform 102 may include one or more processors 111, memory 112, and communication interface 113. A data bus may interconnect processor 111, memory 112, and communication interface 113. Communication interface 113 may be a network interface configured to support communication between asset management platform 102 and one or more networks (e.g., network 101, or the like). Memory 112 may include one or more program modules having instructions that when executed by processor 111 cause asset management platform 102 to perform one or more functions described herein and/or one or more databases that may store and/or otherwise maintain information which may be used by such program modules and/or processor 111. In some instances, the one or more program modules and/or databases may be stored by and/or maintained in different memory units of asset management platform 102 and/or by different computing devices that may form and/or otherwise make up asset management platform 102. For example, memory 112 may have, host, store, and/or include asset management module 112$a$, asset management database 112$b$, and machine learning engine 112$c$.

Asset management module 112$a$ may have instructions that direct and/or cause asset management platform 102 to execute advanced techniques for asset transfer management. Asset management database 112$b$ may store information used by asset management module 112$a$ and/or asset management platform 102 in application of advanced distributed ledger management techniques for asset transfer processing, and/or in performing other functions. Machine learning engine 112$c$ may have instructions that direct and/or cause the asset management platform 102 to set, define, and/or iteratively refine optimization rules and/or other parameters used by the asset management platform 102 and/or other systems in computing environment 100.

Figure 2A:
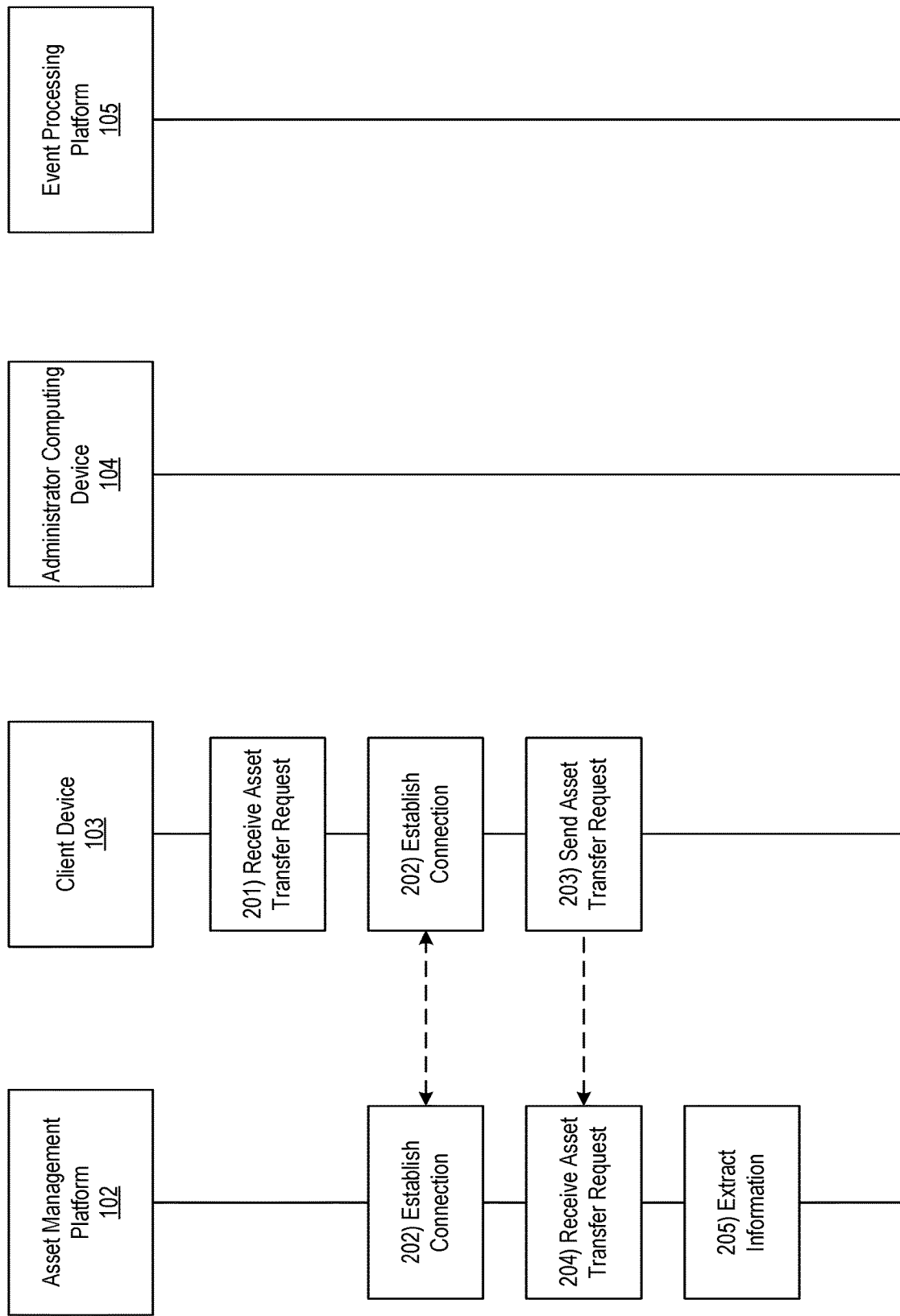

FIGS. 2A-2G depict an illustrative event sequence for an intelligent distributed ledger apparatus for asset transfer in accordance with one or more example embodiments. Referring to FIG. 2A, at step 201, the client device 103 may receive an asset transfer request. For example, the client device 103 may receive a request to transfer one or more assets (e.g., funds, stocks, and/or other assets) from an account corresponding to a first financial institution to an account corresponding to a second, different financial institution (e.g., not an internal transfer). In some instances, the client device 103 may receive the asset transfer request via a mobile application, a website, or other method from an individual such as a customer, accountant, financial advisor, or other individual.

At step 202, the client device 103 may establish a connection with asset management platform 102. For example, the client device 103 may establish a first wireless data connection with the asset management platform 102 to link the client device 103 to the asset management platform 102 (e.g., in preparation for sending the asset transfer request). In some instances, the client device 103 may identify whether or not a connection is already established with the asset management platform 102. If a connection is already established with the asset management platform 102, the client device 103 might not re-establish the connection. If a connection is not yet established with the asset management platform 102, the client device 103 may establish the first wireless data connection as described herein.

At step 203, the client device 103 may send the asset transfer request. For example, the client device 103 may send the asset transfer request while the first wireless data connection is established.

At step 204, the asset management platform 102 may receive the asset transfer request sent at step 203. For example, the asset management platform 102 may receive the asset transfer request via the communication interface 113 and while the first wireless data connection is established. In some instances, in receiving the asset transfer request, the asset management platform 102 may receive an electronic form that includes information related to the asset transfer request.

At step 205, the asset management platform 102 may extract information from the asset transfer request (e.g., from the electronic form). For example, the asset management platform 102 may perform deep learning optical character recognition (OCR) to extract the information. In some instances, the asset management platform 102 may extract all or a portion of the information included in the asset transfer request. For example, the asset management platform 102 may extract one or more of: an originator financial institution corresponding to the asset transfer request, a recipient financial institution corresponding to the asset transfer request, an amount of the asset transfer (e.g., an amount of funds, quantity of stocks, or the like), a recipient account, an originator account, and/or other information that may be used to verify and/or perform the requested asset transfer. In some instances, the asset management platform 102 may be a cloud based computing platform and/or may otherwise communicate with a cloud based computing platform to store the extracted information in the cloud.

Figure 2B:
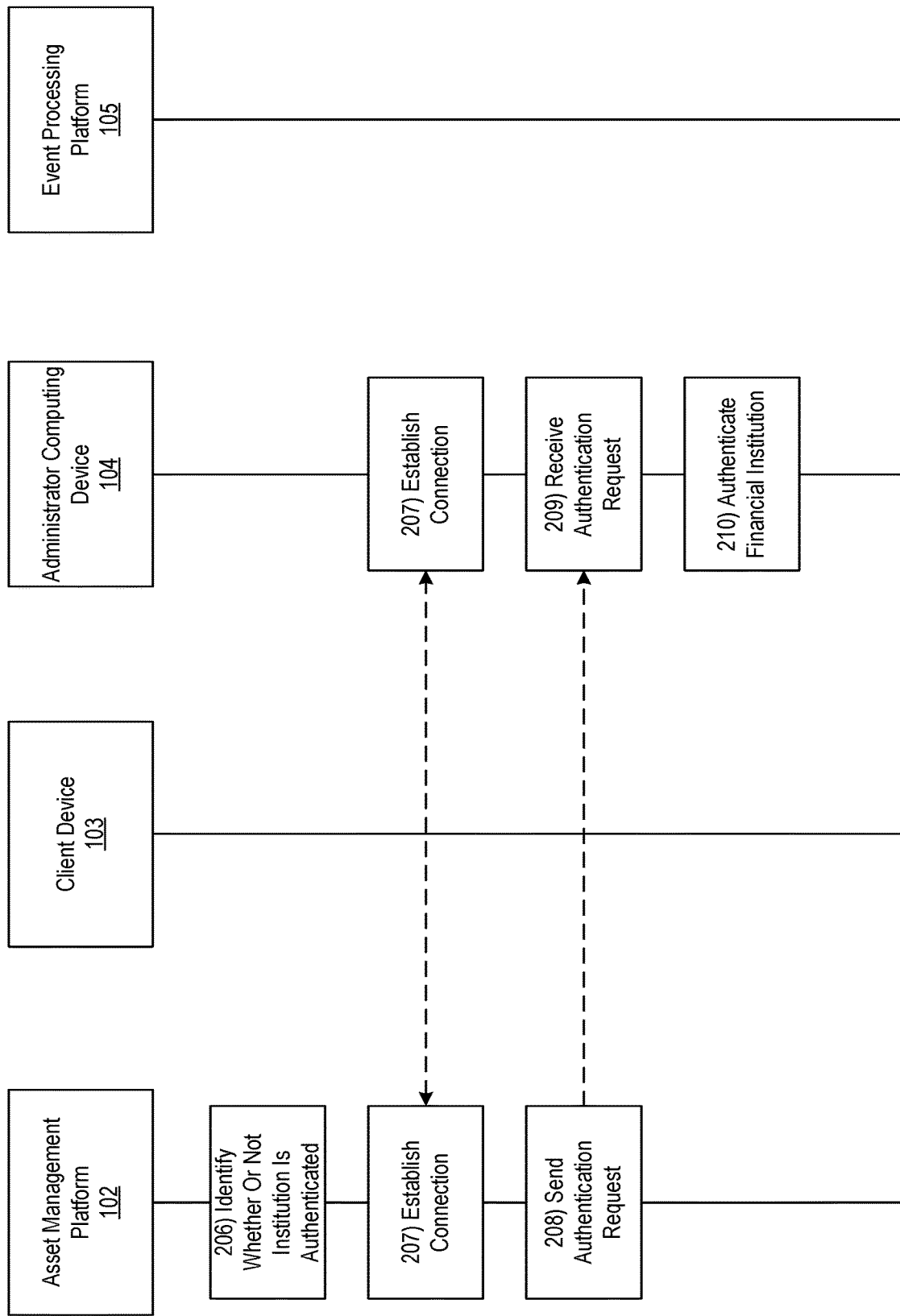

Referring to FIG. 2B, at step 206, the asset management platform 102 may identify whether or not the financial institutions (e.g., the originator and/or the recipient) corresponding to the asset transfer request are authenticated. For example, the asset management platform 102 may maintain a stored list of financial institutions that are authenticated (e.g., by a federal agency or other method), and may compare the financial institutions to the list. If the asset management platform 102 identifies that both financial institutions are authenticated, the asset management platform 102 may proceed to step 213 in FIG. 2C. If the asset management platform 102 identifies that one or more of the financial institutions corresponding to the asset transfer request are not authenticated, the asset management platform 102 may proceed to step 207.

At step 207, the asset management platform 102 may establish a connection with the administrator computing device 104. For example, the asset management platform 102 may establish a second wireless data connection with the administrator computing device 104 to link the asset management platform 102 to the administrator computing device 104 (e.g., in preparation for sending an authentication request). In some instances, the asset management platform 102 may identify whether or not a connection is already established with the administrator computing device 104. If a connection is already established with the administrator computing device 104, the asset management platform 102 might not re-establish the connection. If a connection is not yet established with the administrator computing device 104, the asset management platform 102 may establish the second wireless data connection as described herein.

At step 208, the asset management platform 102 may send an authentication request to the administrator computing device 104, requesting that one or more of the financial institutions corresponding to the asset transfer request be authenticated. For example, the asset management platform 102 may send the authentication request to the administrator computing device 104 via the communication interface 113 and while the second wireless data connection is established.

At step 209, the administrator computing device 104 may receive the authentication request sent at step 208. For example, the administrator computing device 104 may receive the authentication request while the second wireless data connection is established.

At step 210, the administrator computing device 104 may authenticate the financial institution. For example, the administrator computing device 104 may communicate with one or more computing systems corresponding to a federal agency and/or perform other techniques to authenticate the financial institution. For example, the administrator computing device 104 may verify that the financial institution is a valid entity and is reputable for purposes of engaging in the requested asset transfer.

Figure 2C:
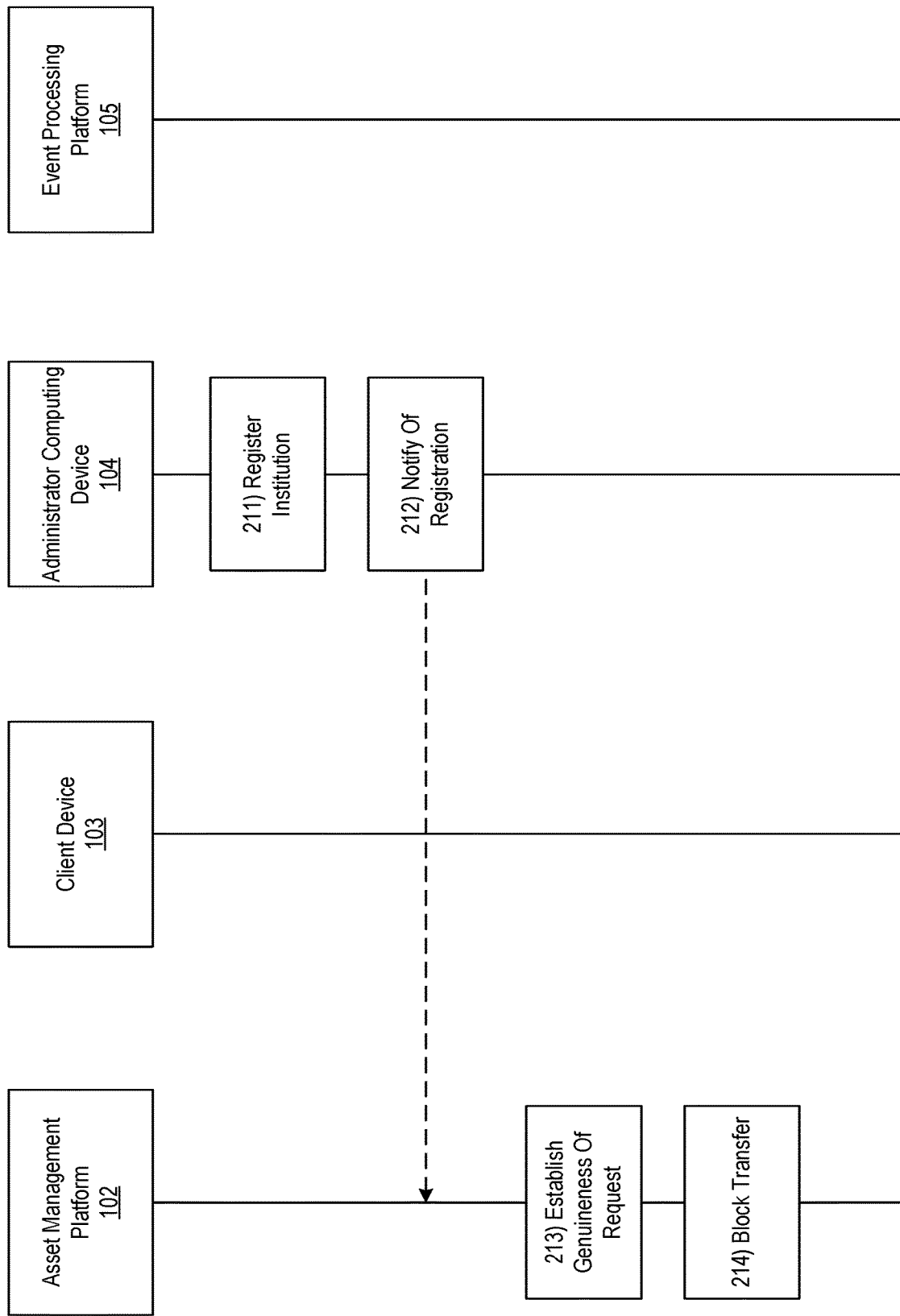

Referring to FIG. 2C, at step 211, if the administrator computing device 104 successfully authenticates the financial institution, it may register the financial institution so as to add the financial institution to the stored list of authenticated financial institutions. In these instances, the administrator computing device 104 may generate a private key corresponding to the financial institution that may be used by the asset management platform 102 to authenticate future requests involving the financial institution. If the administrator computing device 104 identifies that the financial institution is not authenticated, it may proceed to step 212 without adding the financial institution to the list of authenticated financial institutions (and may, in some instances, add the financial institution instead to a list of prohibited financial institutions).

At step 212, the administrator computing device 104 may communicate with the asset management platform 102 to notify the asset management platform 102 of the authenticated financial institution (e.g., and the asset management platform 102 may add the stored list of authenticated financial institutions). If the administrator computing device 104 identifies that the financial institution is not authenticated, it may notify the asset management platform 102 that the asset transfer request should not be executed.

At step 213, the asset management platform 102 may establish whether or not the asset transfer request is genuine. For example, the asset management platform 102 may use the information extracted at step 205 to identify whether the originator account includes sufficient assets to perform the transfer request. For example, the asset management platform 102 may compare the assets of the originator account with the assets requested to be transferred. If the assets of the originator account are sufficient to perform the transfer, the asset management platform 102 may identify that the asset transfer request is genuine, and may proceed to step 215 in FIG. 2D. If the assets of the originator account are insufficient to perform the transfer, the asset management platform 102 may identify that the asset transfer request is not genuine, and may proceed to step 214.

At step 214, the asset management platform 102 may block the requested asset transfer. For example, the asset management platform 102 may prevent the requested assets from being transferred from the originator account to the target recipient account.

Referring to FIG. 2D, at step 215, the asset management platform 102 may identify a mining cluster for a stored distributed ledger. In some instances, the asset management platform 102 may have previously identified the mining cluster (e.g., before receipt of the asset transfer request). For example, the asset management platform 102 may have generated the distributed ledger prior to receipt of the asset transfer request at step 201, and may have then stored the distributed ledger for use in processing the asset transfer request. However, for illustrative purposes, identification of the mining cluster is described at this point in the event sequence.

To do so, the asset management platform 102 may access a knowledgebase that may include an optimal number of computational resources that may be used to mine the distributed ledger (e.g., the number of computational resources that may balance maximizing accuracy while minimizing the number of resources used).

At step 216, the asset management platform 102 may generate a new block for the distributed ledger. For example, the asset management platform 102 may use the extracted information and the mining cluster to generate the block. In some instances, the asset management platform 102 may compute a hash of a previous block in the distributed ledger, and include the hash in the new block. Once the new block is generated, the asset management platform 102 may modify the distributed ledger to include the new block.

At step 217, the asset management platform 102 may identify a consensus method for use in verifying that the asset transfer request should be processed. For example, rather than selecting a single consensus method and applying that method to all blocks of the distributed ledger (which might not result in the most accurate consensus) or applying every consensus method of a plurality of consensus methods to every block of the distributed ledger, the asset management platform 102 may use an optimizer to identify a most efficient consensus method. For example, the asset management platform 102 may use the optimizer to identify a minimum number of blocks to which each of a plurality of consensus methods may be applied (e.g., a first minimum number for a first consensus method, a second minimum number for the second consensus method, or the like), while still yielding an accurate result. To do so, the asset management platform 102 may identify, for each of a plurality of consensus methods, each block in the distributed ledger that has information related to each consensus method, perform random sampling, and/or use other techniques to identify these minimum numbers. In doing so, the asset management platform 102 may use a hybrid bagging consensus method to identify an optimal combination of particular consensus methods applied to particular blocks of the distributed ledger while minimizing processing resources/energy usage (e.g., because consensus need not be determined between all blocks, but rather simply a subset). For example, the asset management platform 102 may identify, for each of a plurality of consensus methods, a subset of blocks from the distributed ledger that, when used to execute the corresponding consensus method, result in a lowest energy consumption value in comparison to remaining subsets of blocks. In some instances, the asset management platform 102 may first determine the minimum number of blocks to achieve consensus for each consensus method, and then may perform, for each consensus method, a bagging method to identify a sample set of blocks that complies with the corresponding minimum number for each particular consensus method.

For example, the asset management platform 102 may identify that the distributed ledger includes blocks 1-5. In this example, the asset management platform 102 may identify that a first consensus method should be applied to blocks 1, 2, and 4, whereas a second consensus method should be applied to blocks 3 and 4. In this example, performing the first consensus method using blocks 1, 2, and 4 may consume less energy and/or computing resources than, for example, if the first consensus method were to be applied to blocks 2, 3, and 5.

With regard to the plurality of consensus methods, the asset management platform 102 may identify a minimum number of blocks to which to apply proof of work, proof of state, proof of elapsed time, raft, proof of importance, proof of authority, proof of activity, proof of capacity, proof of burn, and/or other consensus methods. In some instances the asset management platform 102 may apply a subset of the consensus methods (e.g., rather than applying every method).

After identifying the minimum number of blocks for each consensus method, the asset management platform 102 may store these minimum numbers, along with block combinations having the minimum number for each of the plurality of consensus methods, in a governing block of the distributed ledger. For example, in some instances, the asset management platform 102 may store simulations of combinations having a minimum number of different nodes tested/modelled with each of the consensus methods. In doing so, the asset management platform 102 may access the minimum numbers without repeating the optimization processes described at step 217 each time a new block is added. For example, if a second asset transfer request were to be received, rather than performing the optimization/method selection described above, the asset management platform 102 may simply consult the governing block to identify minimum numbers of blocks to which each consensus method should be applied (e.g., and subsequently execute, using each corresponding identified subset of the existing blocks, each of the plurality of consensus methods). Nevertheless, in some instances, the asset management platform 102 may periodically update the governing block (e.g., as new blocks are added to the distributed ledger, as new consensus methods are established, and/or for other reasons) so as to maintain optimization of the consensus method. In some instances, the asset management platform 102 may store different minimum numbers in the governing block (or in another governing block) corresponding to different use cases. For example, the asset management platform 102 may identify and store first numbers for fund transfers, and second number for stock transfers (or transfer of other types of assets).

At step 218, the asset management platform 102 may use the identified consensus method from step 217 to identify whether or not consensus is established, among the distributed ledger, for the new block. For example, the asset management platform 102 may apply each consensus method to the corresponding identified subset of blocks in the distributed ledger (e.g., which may be the minimum number of blocks identified for each consensus method). This may result in the asset management platform 102 generating a value of "consensus achieved" or "consensus not achieved" (or something to that effect). This method described in steps 216-218 is further illustrated with regard to FIG. 5, which is described below.

Figure 2E:
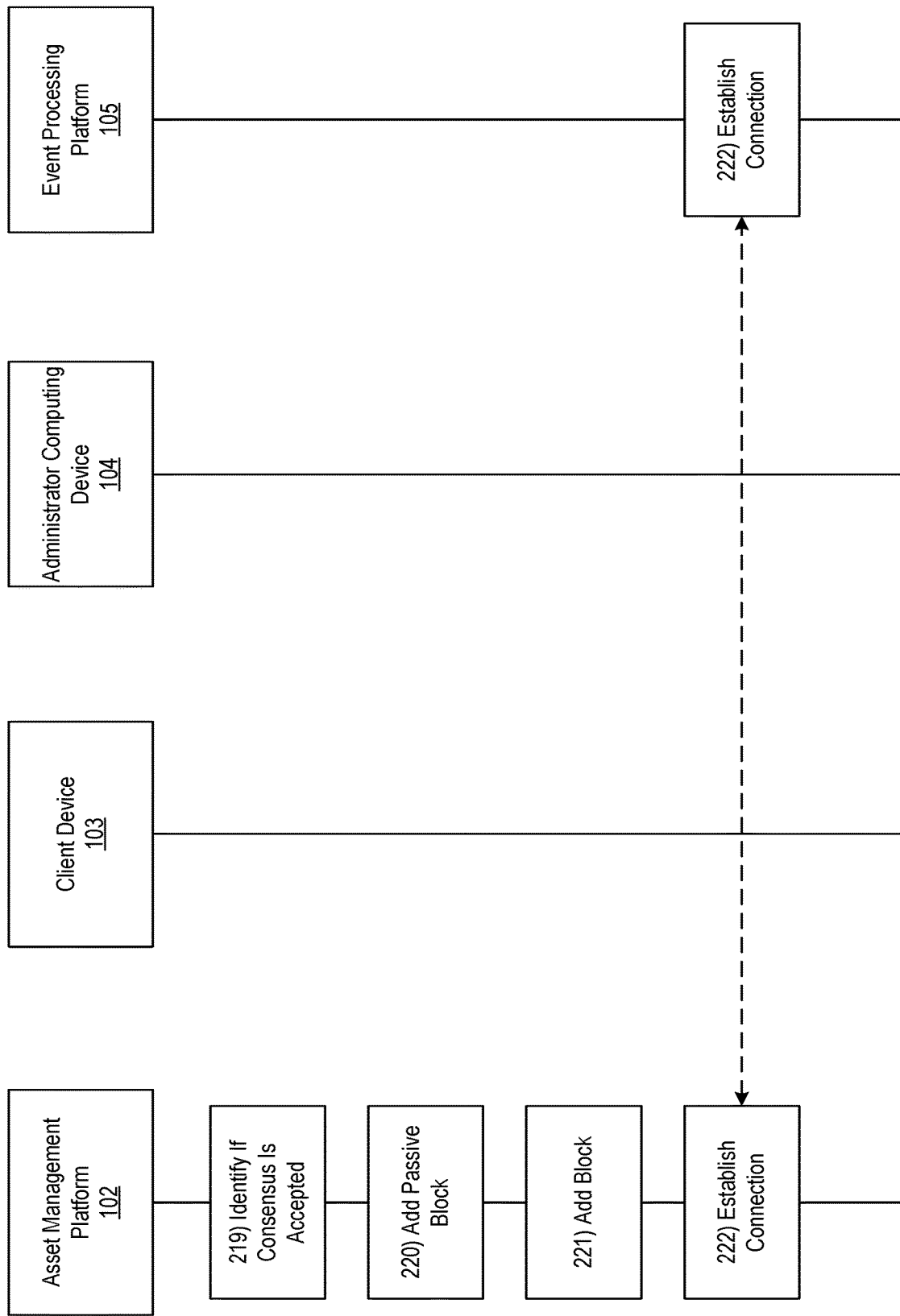

Referring to FIG. 2E, at step 219, the asset management platform 102 may identify whether or not the consensus was accepted. For example, if the consensus was accepted (e.g., consensus achieved), the asset management platform 102 may proceed to step 221. In contrast, if the consensus was not accepted (e.g., no consensus), the asset management platform 102 may proceed to step 220.

At step 220, the asset management platform 102 may add a passive block, corresponding to the requested asset transfer, to the distributed ledger. In doing so, the asset management platform 102 may add a block that indicates the attempt to perform the requested asset transfer for record keeping purposes, but might not actually process the requested asset transfer, and thus might not include processing information in the block. In these instances, the asset management platform 102 may include information in the block indicating that consensus was not achieved for the requested asset transfer. Subsequently, the event sequence may end.

At step 221, the asset management platform 102 may add a regular block to the distributed ledger. For example, the asset management platform 102 may add a block indicating that consensus was achieved and, in some instances, may include processing information for the requested asset transfer.

At step 222, the asset management platform may establish a connection with the event processing platform 105. For example, the asset management platform 102 may establish a third wireless data connection with the event processing platform 105 to link the asset management platform 102 to the event processing platform 105 (e.g., in preparation for sending an event processing request). In some instances, the asset management platform 102 may identify whether or not a connection is already established with the event processing platform 105. If a connection is already established with the event processing platform 105, the asset management platform 102 might not re-establish the connection with the event processing platform 105. If a connection is not yet established with the event processing platform 105, the asset management platform 102 may establish the third wireless data connection as described herein.

Figure 2F:
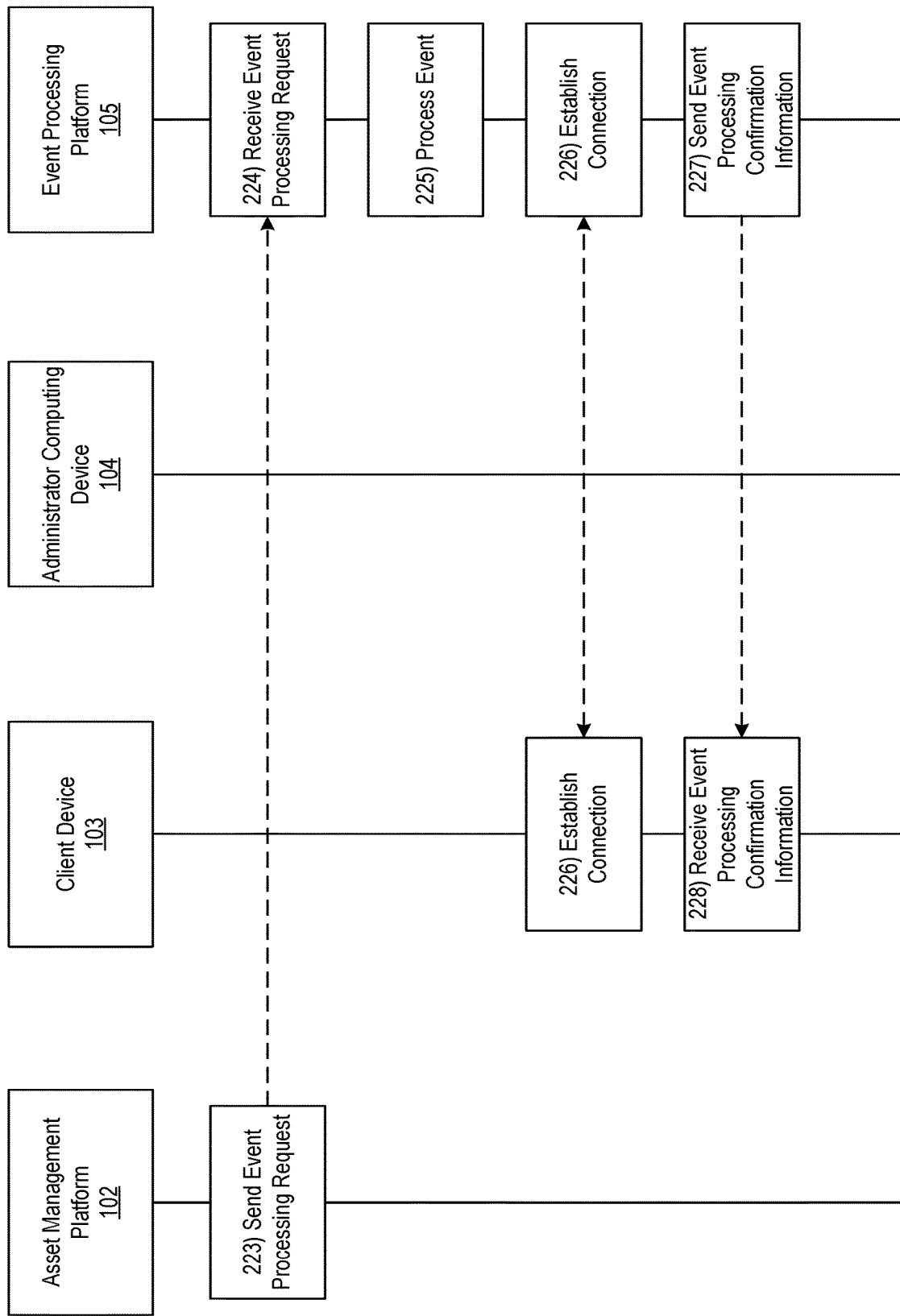

Referring to FIG. 2F, at step 223, based on or in response to establishing the consensus, the asset management platform 102 may send one or more commands directing the event processing platform 105 to process an event. For example, the asset management platform 102 may send a request to process the requested asset transfer (e.g., transfer funds, stocks, and/or other assets). In some instances, the asset management platform 102 may send the event processing request to the event processing platform 105 via the communication interface 113 and while the third wireless data connection is established.

At step 224, the event processing platform 105 may receive the one or more event processing commands sent at step 223. For example, the event processing platform 105 may receive the event processing request while the third wireless data connection is established.

At step 225, based on or in response to the one or more commands, the event processing platform 105 may process the event corresponding to the asset transfer request. For example, the event processing platform 105 may transfer funds, stocks, and/or other assets from the originator account to the recipient account specified in the asset transfer request. In some instances, the event processing platform 105 may deduct one or more assets (e.g., on behalf of a processing entity, financial institution, or the like) from the total amount of assets being transferred prior to processing the event.

At step 226, the event processing platform 105 may establish a connection with the client device 103. For example, the event processing platform 105 may establish a fourth wireless data connection with the client device 103 to link the event processing platform 105 to the client device 103 (e.g., in preparation for sending event processing confirmation information). For example, the event processing platform 105 may identify whether or not a connection is already established with the client device 103. If a connection is already established with the client device 103, the event processing platform 105 might not re-establish the connection. If a connection is not yet established with the client device 103, the event processing platform 105 may establish the fourth wireless data connection as described herein.

At step 227, the event processing platform 105 may send event processing confirmation information indicating that the asset transfer request has been satisfied. In some instances, the event processing platform 105 may also send one or more commands directing the client device 103 to display the event processing confirmation information. In some instances, the event processing platform 105 may send the event processing confirmation information while the fourth wireless data connection is established.

At step 228, the client device 103 may receive the event processing confirmation information. In some instances, the client device 103 may also receive the one or more commands directing the client device 103 to display the event processing confirmation information. In some instances, the client device 103 may receive the event processing confirmation information while the fourth wireless data connection is established.

Figure 2G:
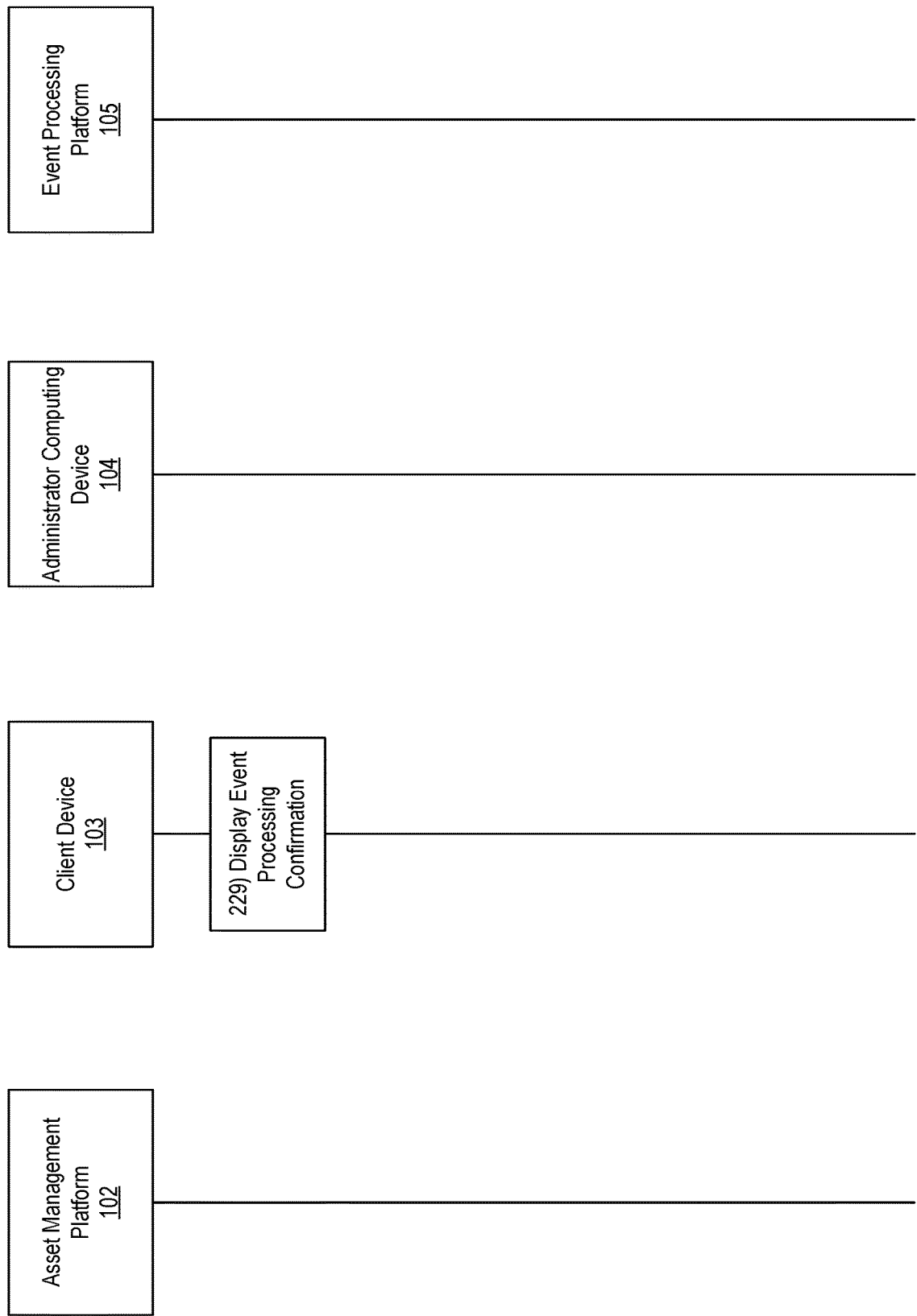
Figure 4:
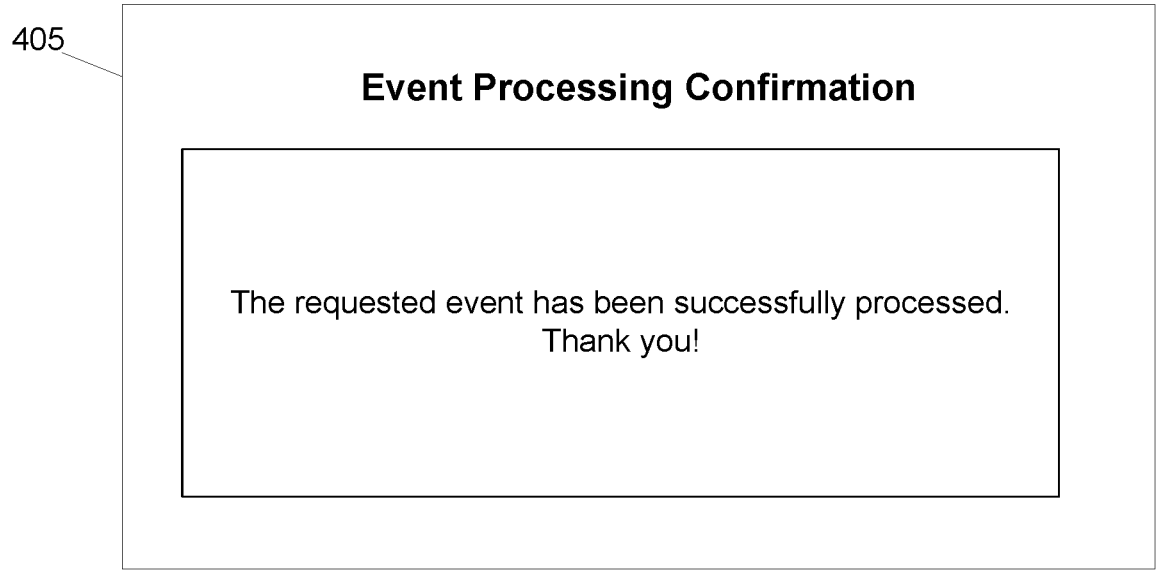
FIG. 4 depicts an illustrative graphical user interface for an intelligent distributed ledger apparatus for asset transfer in accordance with one or more example embodiments.

Referring to FIG. 2G, at step 229, based on or in response to the one or more commands directing the client device 103 to display the event processing confirmation information, the client device 103 may display the event processing confirmation information. For example, the client device 103 may display a graphical user interface similar to graphical user interface 405, which is illustrated in FIG. 4, and that provides confirmation that the requested asset transfer has been successfully completed.

Figure 3:
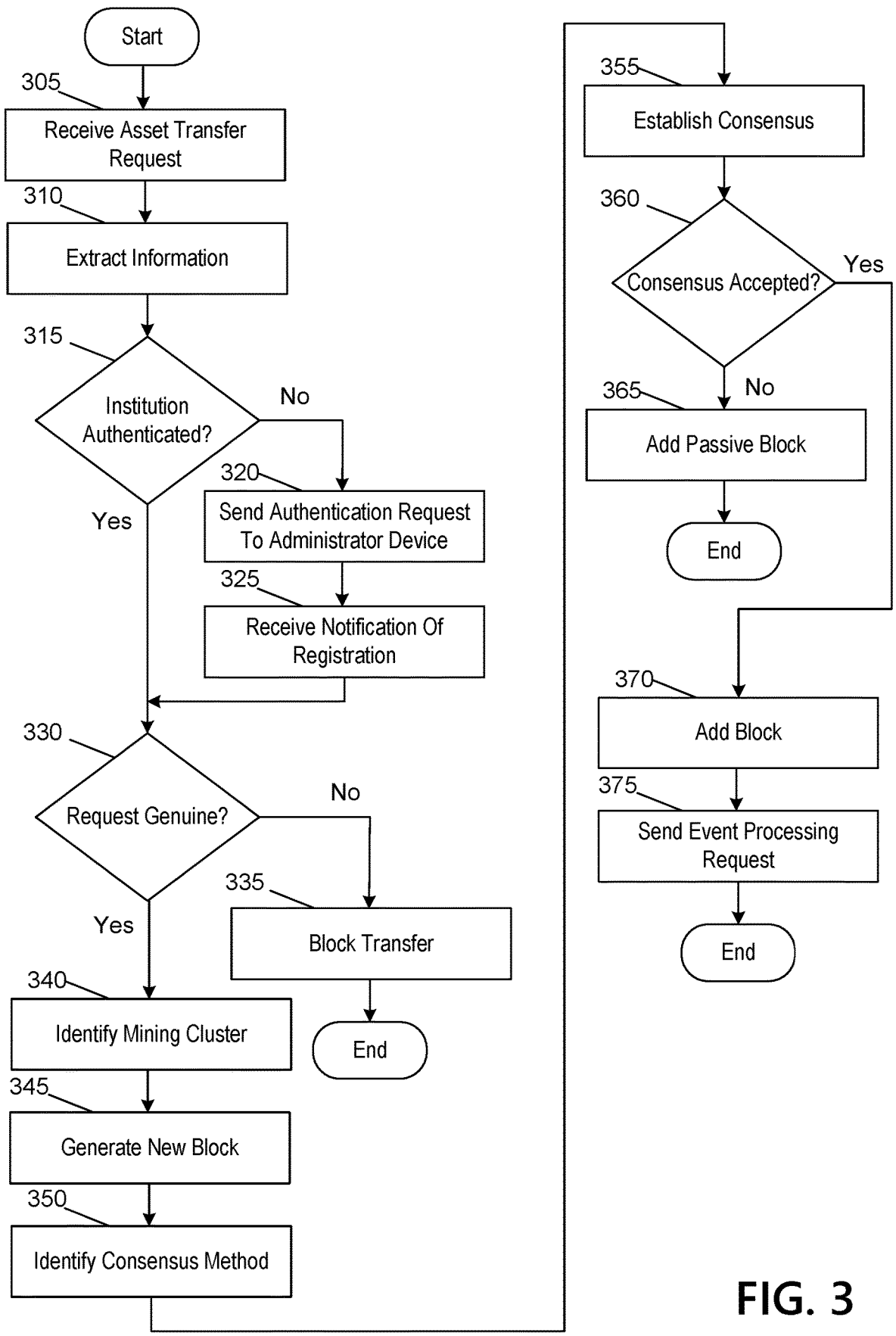
FIGS. 3 and 5 depict illustrative methods for an intelligent distributed ledger apparatus for asset transfer in accordance with one or more example embodiments.

FIG. 3 depicts an illustrative method for an intelligent distributed ledger apparatus for asset transfer in accordance with one or more example embodiments. Referring to FIG. 3, at step 305, a computing platform having at least one processor, a communication interface, and memory may receive an asset transfer request. At step 310, the computing platform may extract information from the asset transfer request. At step 315, the computing platform may identify whether or not a financial institution corresponding to the asset transfer request is authenticated. If the financial institution is authenticated, the computing platform may proceed to step 330. If the financial institution is not authenticated, the computing platform may proceed to step 320.

At step 320, the computing platform may send an authentication request to an administrator computing device. At step 325, the computing platform may receive notification of registration of the financial institution.

At the 330, the computing platform may identify whether or not the asset transfer request is genuine. If the asset transfer request is not genuine, the computing platform may proceed to step 335. At step 335, the computing platform may block the requested asset transfer, and the method may end.

Returning to step 330, if the asset transfer request is genuine, the computing platform may proceed to step 340. At step 340, the computing platform may identify a mining cluster for a distributed ledger. At step 345, the computing platform may use the mining cluster to generate a new block in the distributed ledger corresponding to the requested asset transfer. At step 350, the computing platform may identify a consensus method for the distributed ledger. At step 355, the computing platform may use the consensus method to establish consensus. At step 360, the computing platform may identify whether or not consensus was achieved. If consensus was not achieved, the computing platform may proceed to step 365. At step 365, the computing platform may add a passive block to the distributed ledger representing the failed asset transfer request, and the method may end.

Returning to step 360, if consensus was achieved, the computing platform may proceed to step 370. At step 370, the computing platform may add a regular block to the distributed ledger representing the successful asset transfer request. At step 375, the computing platform may send an event processing request directing an event processing platform to process an asset transfer corresponding to the request.

Figure 5:
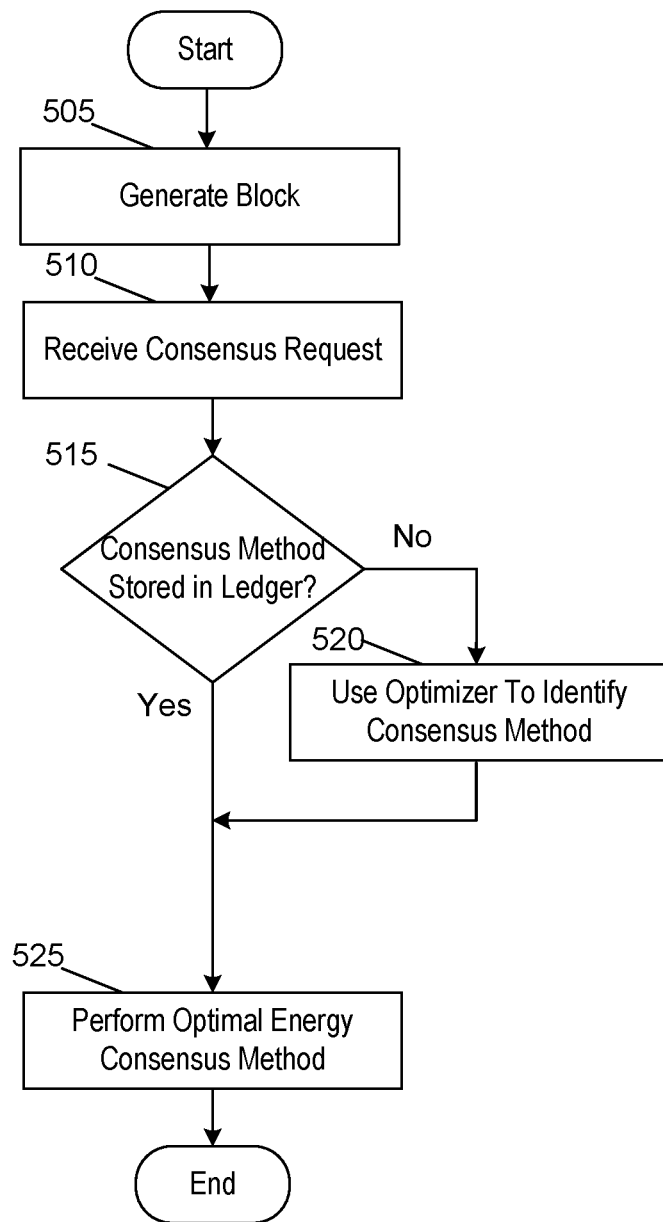

FIG. 5 depicts an illustrative method for an intelligent distributed ledger apparatus for asset transfer in accordance with one or more example embodiments. At step 505, a computing platform having at least one processor, a communication interface, and memory may generate a block (e.g., a block corresponding to an asset transfer request). At step 510, the computing platform may receive a request to obtain consensus from a distributed ledger for the block. At step 515, the computing platform may identify whether or not a consensus method is accessible from a governing block of the distributed ledger (e.g., a previously identified consensus method for energy optimization). If so, the computing platform may proceed to step 525 and perform the optimal energy consensus method to identify whether or not consensus is achieved with regard to the new block. If not, the computing platform may proceed to step 520, and may use an optimizer to identify consensus method for energy optimization. For example, as described above with regard to step 217, the computing platform may identify a minimum number of blocks in the distributed ledger to which each of a plurality of consensus methods should be applied. The computing platform may then proceed to step 525 to apply each of the plurality of consensus methods to a number of blocks (which may be selected through a bagging process) equal to the corresponding minimum number of blocks for each consensus method.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      receive an asset transfer request;
      extract, using deep learning based optical character recognition (OCR), information from the asset transfer request;
      identify a mining cluster for a stored distributed ledger;
      modify, using the mining cluster, the stored distributed ledger to include a new block corresponding to the asset transfer request;
      identify an overall consensus method, wherein identifying the overall consensus method comprises:
         identifying, for each of a plurality of consensus methods and using a hybrid bagging approach comprising random sampling and a bagging method, a minimum number of blocks needed to establish consensus using a corresponding consensus method, wherein identifying the minimum number of blocks comprises, for each corresponding consensus method:
            identifying related information comprising information used to execute the corresponding consensus method,
            identifying blocks of the stored distributed ledger that include the related information,
            identifying, using the random sampling, the minimum number of blocks, and
            selecting, using the bagging method, a subset of the blocks of the stored distributed ledger that include the related information, wherein the subset of the blocks corresponds to the minimum number of blocks;
      execute each of the plurality of consensus methods using the corresponding identified blocks, wherein executing each of the plurality of consensus methods using the minimum number of blocks consumes less processing power than executing each of the plurality of consensus methods using all blocks of the stored distributed ledger, and wherein executing each of the plurality of consensus methods rather than a single consensus method increases a level of security corresponding to the asset transfer request;
      establish, based on execution of each of the plurality of consensus methods, consensus to process the asset transfer request;
      based on establishing the consensus, send one or more commands directing an event processing platform to process an event corresponding to the asset transfer request, wherein sending the one or more commands directing the event processing platform to process the event corresponding to the asset transfer request causes the event processing platform to process the event; and
      store, in a governing block of the stored distributed ledger, and for each of the consensus methods:
         the corresponding minimum number of blocks; and
         subsets of the blocks of the stored distributed ledger that include the related information, wherein:
            each subset corresponds to the minimum number of blocks, and
            storage of the minimum number of blocks in the governing block optimizes energy usage associated with identifying future overall consensus methods.

2. The computing platform of claim 1, wherein the information includes one or more of: a financial institution corresponding to the asset transfer request, an amount of the asset transfer, a recipient account, or an originator account.

3. The computing platform of claim 2, wherein the memory stores additional computer-readable instructions that, when executed by the at least one processor, cause the computing platform to:
   identify, using the information and a stored list of authenticated financial institutions, whether or not the financial institution corresponding to the asset transfer request is authenticated;
   based on identifying that the financial institution corresponding to the asset transfer request is not authenticated, send an authentication request to an administrator computing device; and
   based on identifying that the financial institution corresponding to the asset transfer request is authenticated, proceed to establish whether or not the asset transfer request is genuine.

4. The computing platform of claim 3, wherein establishing whether or not the asset transfer request is genuine comprises identifying whether or not the originator account includes sufficient assets to perform the asset transfer.

5. The computing platform of claim 4, wherein the memory stores additional computer-readable instructions that, when executed by the at least one processor, cause the computing platform to:
   based on identifying that the asset transfer request is not genuine, block the asset transfer; and
   based on identifying that the asset transfer request is genuine, perform generation of the new block.

6. The computing platform of claim 1, wherein the plurality of consensus methods includes one or more of: proof of work, proof of stake, proof of elapsed time, raft, proof of importance, proof of authority, proof of activity, proof of capacity, or proof of burn.

7. The computing platform of claim 1, wherein the governing block is configured to store a first set of minimum numbers of blocks for a first type of asset transfer requests and a second set of minimum numbers of blocks for a second type of asset transfer requests.

8. The computing platform of claim 1, wherein processing the event comprises executing a fund transfer.

9. The computing platform of claim 1, wherein the memory stores additional computer-readable instructions that, when executed by the at least one processor, cause the computing platform to:
   receive a second asset transfer request;
   identify, by executing each of the plurality of consensus methods, that consensus is not established for the second asset transfer request; and
   modify, based on identifying that consensus is not established, the stored distributed ledger to include a passive block representing the second asset transfer request.

10. A method comprising:
at a computing platform comprising at least one processor, a communication interface, and memory:
receiving an asset transfer request;
extracting, using deep learning based optical character recognition (OCR), information from the asset transfer request;
identifying a mining cluster for a stored distributed ledger;
modifying, using the mining cluster, the stored distributed ledger to include a new block corresponding to the asset transfer request;
identifying an overall consensus method, wherein identifying the overall consensus method comprises:
identifying, for each of a plurality of consensus methods and using a hybrid bagging approach comprising random sampling and a bagging method, a minimum number of blocks needed to establish consensus using a corresponding consensus method, wherein identifying the minimum number of blocks comprises, for each corresponding consensus method:
identifying related information comprising information used to execute the corresponding consensus method,
identifying blocks of the stored distributed ledger that include the related information,
identifying, using the random sampling, the minimum number of blocks, and
selecting, using the bagging method, a subset of the blocks of the stored distributed ledger that include the related information, wherein the subset of the blocks corresponds to the minimum number of blocks;
executing each of the plurality of consensus methods using the corresponding identified blocks, wherein executing each of the plurality of consensus methods using the minimum number of blocks consumes less processing power than executing each of the plurality of consensus methods using all blocks of the stored distributed ledger, and wherein executing each of the plurality of consensus methods rather than a single consensus method increases a level of security corresponding to the asset transfer request;
establishing, based on execution of each of the plurality of consensus methods, consensus to process the asset transfer request;
based on establishing the consensus, sending one or more commands directing an event processing platform to process an event corresponding to the asset transfer request, wherein sending the one or more commands directing the event processing platform to process the event corresponding to the asset transfer request causes the event processing platform to process the event; and
storing, in a governing block of the stored distributed ledger, and for each of the consensus methods:
the corresponding minimum number of blocks; and
subsets of the blocks of the stored distributed ledger that include the related information, wherein:
each subset corresponds to the minimum number of blocks, and
storage of the minimum number of blocks in the governing block optimizes energy usage associated with identifying future overall consensus methods.

11. The method of claim 10, wherein the information includes one or more of:
a financial institution corresponding to the asset transfer request, an amount of the asset transfer, a recipient account, or an originator account.

12. The method of claim 11, further comprising:
identifying, using the information and a stored list of authenticated financial institutions, whether or not the financial institution corresponding to the asset transfer request is authenticated;
based on identifying that the financial institution corresponding to the asset transfer request is not authenticated, sending an authentication request to an administrator computing device; and
based on identifying that the financial institution corresponding to the asset transfer request is authenticated, proceeding to establish whether or not the asset transfer request is genuine.

13. The method of claim 12, wherein establishing whether or not the asset transfer request is genuine comprises identifying whether or not the originator account includes sufficient assets to perform the asset transfer.

14. The method of claim 13, further comprising:
based on identifying that the asset transfer request is not genuine, blocking the asset transfer; and
based on identifying that the asset transfer request is genuine, performing generation of the new block.

15. The method of claim 10, wherein the plurality of consensus methods includes one or more of: proof of work, proof of stake, proof of elapsed time, raft, proof of importance, proof of authority, proof of activity, proof of capacity, or proof of burn.

16. One or more non-transitory computer-readable media storing instructions that, when executed by a computing platform comprising at least one processor, a communication interface, and memory, cause the computing platform to:
receive an asset transfer request;
extract, using deep learning based optical character recognition (OCR), information from the asset transfer request;
identify a mining cluster for a stored distributed ledger;
modify, using the mining cluster, the stored distributed ledger to include a new block corresponding to the asset transfer request;
identify an overall consensus method, wherein identifying the overall consensus method comprises:
identifying, for each of a plurality of consensus methods and using a hybrid bagging approach comprising random sampling and a bagging method, a minimum number of blocks needed to establish consensus using a corresponding consensus method, wherein identifying the minimum number of blocks comprises, for each corresponding consensus method:
identifying related information comprising information used to execute the corresponding consensus method,
identifying blocks of the stored distributed ledger that include the related information,
identifying, using the random sampling, the minimum number of blocks, and
selecting, using the bagging method, a subset of the blocks of the stored distributed ledger that include the related information, wherein the subset of the blocks corresponds to the minimum number of blocks;
execute each of the plurality of consensus methods using the corresponding identified blocks, wherein executing each of the plurality of consensus methods using the minimum number of blocks consumes less processing power than executing each of the plurality of consensus methods using all blocks of the stored distributed ledger, and wherein executing each of the plurality of consensus methods rather than a single consensus method increases a level of security corresponding to the asset transfer request;

establish, based on execution of each of the plurality of consensus methods, consensus to process the asset transfer request;

based on establishing the consensus, send one or more commands directing an event processing platform to process an event corresponding to the asset transfer request, wherein sending the one or more commands directing the event processing platform to process the event corresponding to the asset transfer request causes the event processing platform to process the event; and store, in a governing block of the stored distributed ledger, and for each of the consensus methods:
the corresponding minimum number of blocks; and
subsets of the blocks of the stored distributed ledger that include the related information, wherein:
each subset corresponds to the minimum number of blocks, and
storage of the minimum number of blocks in the governing block optimizes energy usage associated with identifying future overall consensus methods.

17. The computing platform of claim 1, wherein memory stores additional computer-readable instructions that, when executed by the one or more processors, cause the computing platform to:

receive, after the asset transfer request, a second asset transfer request;

identify the overall consensus method, wherein identifying the consensus method comprises:
accessing, for each of the consensus methods and from the governing block, the corresponding subsets of the blocks of the stored distributed ledger that include the related information; and
execute each of the plurality of consensus methods using the corresponding subsets of blocks.

18. The method of claim 10, further comprising:

receiving, after the asset transfer request, a second asset transfer request;

identifying the overall consensus method, wherein identifying the consensus method comprises:
accessing, for each of the consensus methods and from the governing block, the corresponding subsets of the blocks of the stored distributed ledger that include the related information; and
executing each of the plurality of consensus methods using the corresponding subsets of blocks.

19. The method of claim 10, wherein processing the event comprises executing a fund transfer.

20. The method of claim 10, further comprising:

receiving a second asset transfer request;

identifying, by executing each of the plurality of consensus methods, that consensus is not established for the second asset transfer request; and modifying, based on identifying that consensus is not established, the stored distributed ledger to include a passive block representing the second asset transfer request.

* * * * *